US011799543B2

(12) United States Patent
Durvasula

(10) Patent No.: US 11,799,543 B2
(45) Date of Patent: Oct. 24, 2023

(54) COMMUNITY BROADBAND LTE ACCESS OVER SATELLITE

(71) Applicant: HUGHES NETWORK SYSTEMS, LLC, Germantown, MD (US)

(72) Inventor: Bhanu Durvasula, Potomac, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 85 days.

(21) Appl. No.: 17/326,736

(22) Filed: May 21, 2021

(65) Prior Publication Data

US 2021/0384967 A1 Dec. 9, 2021

Related U.S. Application Data

(60) Provisional application No. 63/034,371, filed on Jun. 3, 2020.

(51) Int. Cl.
*H04B 7/185* (2006.01)
*H04W 4/24* (2018.01)
*H04W 88/08* (2009.01)
*H04W 84/04* (2009.01)

(52) U.S. Cl.
CPC ......... *H04B 7/18523* (2013.01); *H04W 4/24* (2013.01); *H04W 84/045* (2013.01); *H04W 88/08* (2013.01)

(58) Field of Classification Search
CPC .. H04B 7/18523; H04W 4/24; H04W 84/045; H04W 88/08
See application file for complete search history.

(56) References Cited

U.S. PATENT DOCUMENTS

| | | | |
|---|---|---|---|
| 2012/0072976 A1* | 3/2012 | Patil | H04W 12/069 726/5 |
| 2014/0053243 A1 | 2/2014 | Walsh et al. | |
| 2014/0376559 A1* | 12/2014 | Diwane | H04L 12/4641 370/401 |
| 2016/0373588 A1* | 12/2016 | Raleigh | H04L 12/1407 |
| 2017/0230478 A1 | 8/2017 | Huang et al. | |
| 2018/0192412 A1* | 7/2018 | Novlan | H04W 76/10 |
| 2018/0205639 A1* | 7/2018 | Zakaria | H04L 45/22 |
| 2020/0343643 A1* | 10/2020 | Zhang | H01Q 1/38 |

OTHER PUBLICATIONS

International Search Report and Written Opinion dated Jul. 26, 2021 in corresponding PCT/US2021/034244.

* cited by examiner

*Primary Examiner* — Ernest G Tacsik
(74) *Attorney, Agent, or Firm* — NovoTechIP International PLLC

(57) ABSTRACT

A system and method for providing community-based broadband access are disclosed. The system is configured to provide private LTE based broadband access at remote areas that are served by satellite backhaul. The system is also configured to provide a community-based Wi-Fi like broadband service where users can purchase hourly, weekly, or monthly data packs as and when desired. The LTE base station, LTE core network, and satellite terminal included in the system are all deployed at the remote location to efficiently connect users to the internet over satellite backhaul. The system architecture further expands broadband reach for users in remote areas as compared to coverage with current satellite-based Community Wi-Fi hot spots, and provides an integrated backend system for LTE and Wi-Fi based access.

18 Claims, 8 Drawing Sheets

COMMUNITY BROADBAND LTE ACCESS OVER SATELLITE

CROSS-REFERENCE TO RELATED APPLICATION

This application claims priority to U.S. Provisional Patent Application No. 63/034,371, filed Jun. 3, 2020, and entitled "Community Broadband LTE Access over Satellite," the disclosure of which is hereby incorporated by reference in its entirety.

BACKGROUND

Broadband Internet has become an invaluable tool for telecommunications for receiving and sending digital content. However, many parts of the world are unserved or underserved by broadband services due to limited or a complete lack of network infrastructure. There are significant areas for new and improved mechanisms for providing broadband access.

SUMMARY

This Summary identifies example features and aspects and is not an exclusive or exhaustive description of the disclosed subject matter. Whether features or aspects are included in, or omitted from this Summary is not intended as indicative of relative importance of such features. Additional features and aspects are described, and others will become apparent to persons skilled in the art upon reading the following detailed description and viewing the drawings that form a part thereof.

An example of disclosed systems for providing community-based broadband access can be configured to receive a network access request from a user device to permit the user device to access the broadband services through the wireless base station; direct the user device to display a captive portal; receive payment information for a data pack from the user device, wherein the data pack provides the user device with a predetermined amount of data access to the broadband services, a predetermined amount of time of access to the broadband services, or a combination thereof; process the payment information; activate the data pack for the user device responsive to successfully processing the payment information; and provide broadband connectivity to the user device responsive to activating the data pack.

An example of disclosed method can include receiving a network access request from a user device to permit the user device to access the broadband services through the wireless base station; directing the user device to display a captive portal; receiving payment information for a data pack from the user device, wherein the data pack provides the user device with a predetermined amount of data access to the broadband services, a predetermined amount of time of access to the broadband services, or a combination thereof; processing the payment information; activating the data pack for the user device responsive to successfully processing the payment information; and providing broadband connectivity to the user device responsive to activating the data pack.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
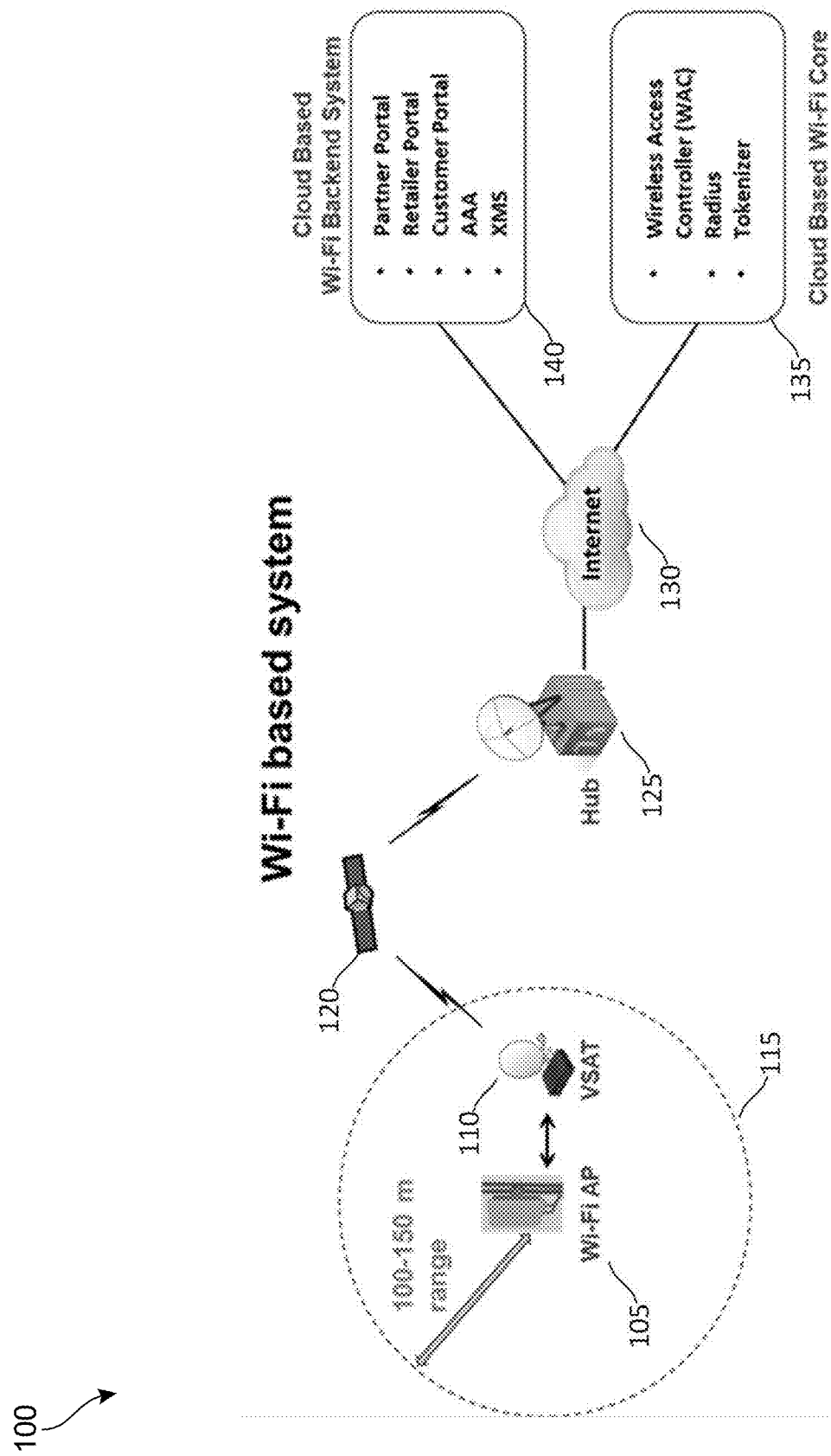
FIG. 1 is a block diagram showing an example computing environment providing Wi-Fi based network coverage to remote geographical areas.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for providing broadband access with an extension of community Wi-fi and integrated backend system are provided herein. The techniques disclosed herein may provide broadband access to unserved and/or underserved areas of the world. The unserved areas may have no network infrastructure for providing broadband access, while underserved areas may have a network infrastructure that is inadequate to meet the needs of a community. The broadband access includes transmitting wide bandwidth data over a high-speed Internet connection via multiple types of technologies including fiber optics, wireless, cable, Digital Subscriber Line (DSL), and satellite. The techniques disclosed herein provide a technical solution to the technical problem of providing broadband network access to unserved or underserved areas by providing a base station for a wireless mobile network at the location for which broadband is to be provided and providing a satellite backhaul for the base station to provide network connectivity to the base station. The base station serves as a hub of a local wireless network providing the coverage. The base station may be configured to support the Long-Term Evolution (LTE) wireless standards and/or other such standards for mobile wireless communications. A technical benefit of using such a base station is that the base station can provide a significantly larger coverage area than that may be provided by a Wi-Fi access point. In other words, the techniques disclosed herein expand broadband reach for users in remote areas as compared to the coverage with current satellite-based community Wi-Fi hot spot technologies.

The techniques disclosed herein may provide a community-based Wi-Fi like broadband network to remote areas where affordability of such connectivity is a critical concern. Cellular network subscriptions are typically very expensive in many remote areas and/or involve recurring service charges. These charges may be prepaid, or post-paid based on usage after the fact. The techniques disclosed herein provide a flexible solution in which users are not required to maintain a subscription with such recurring charges. Instead, the users may purchase broadband connectivity in hourly, weekly, or monthly data packs as needed and when desired. Some Wi-Fi based communications systems provide such flexible access purchasing but do not provide for the extended coverage areas provided by the community-based Wi-Fi like broadband network solution such as that disclosed herein.

The techniques disclosed herein may deploy and configure the base station, broadband core network, and satellite terminal all at a remote location. With such deployment, Internet traffic will mostly be transmitted via the satellite link while other data traffic will be processed in the local by the base station and broadband core network, thereby efficiently connecting users to the Internet over the satellite backhaul.

Moreover, the techniques disclosed herein may also support direct broadband access (e.g., LTE access) and broadband access with Customer Premise Equipment (e.g., LTE CPE access). Users may have direct broadband access with their devices, or the users may connect to a CPE via Wi-Fi and the CPE has a broadband connection to the base station. However, the techniques disclosed herein provide an integrated backend system for both broadband access and broadband CPE Wi-Fi based access.

Overall, the techniques disclosed herein are advantageous at least in the aspects of (1) providing private broadband access at remote areas; (2) offering a community-based Wi-Fi like broadband service where users can purchase hourly, weekly, or monthly data packs as necessary and when desired; (3) including the broadband base station, core network, and satellite terminal at the remote areas to optimize the data usage over the satellite terminal; (4) extending community Wi-Fi access through broadband network for users in the remote areas than satellite-based Community Wi-Fi hot spots; and (5) using integrated backend system to provide transparent data services to end-users having direct and indirect (Wi-Fi based) broadband access.

FIG. 1 shows an example network environment 100 that provides a Wi-Fi based solution for providing Internet connectivity to remote geographical areas. The network environment 100 is an end-to-end architecture that may be used to provide Internet connectivity to remote towns or villages that may not have other means for connecting to the Internet. However, such systems/environment included in the existing solution have significant limitations, such as an extremely limited coverage area, that do not make this a practical solution for many users.

The network environment 100 includes an access point 105 having a coverage area 115. The access point 105 is connected to a Very Small Aperture Terminal (VSAT) 110. The VSAT 110 is a satellite ground station or satellite terminal configured to communicate with the satellite 120. The terms "VSAT," "satellite ground station," and "satellite terminal" may be interchangeably used in the description below. The VSAT 110 may provide a backhaul connection to the access point 105 via the satellite 120. The satellite 120 may also be configured to communicate with the satellite hub 125 to access the Internet 130. For example, the VSAT 110 may be configured to provide a reverse uplink (RLU) to the satellite 120 for communication over a reverse downlink (RDL) to the satellite hub 125. The satellite hub 125 may send packets over a forward uplink (FLU) to the satellite 120, and the satellite 120 may send such packets over a forward downlink (FDL) to the VSAT 110. While the implementation shown in FIG. 1 includes a single satellite, more than one satellite may be used in other implementations. Furthermore, a single satellite may be configured to support more than one VSAT 110 and access point 105.

The network environment 100 may include a Wi-Fi Backend System (WBS) 140 and/or a Wi-Fi Core (WC) 135. The WC 135 may comprise one or more computing devices configured to provide core network services associated with the network environment 100. The WBS 140 may comprise one or more computing devices configured to provide other services unrelated to the operation of the core network.

The WBS 140 may provide portals that facilitate access to partners, retailers, and/or customers. For example, a partner portal may provide an interface for network providers that partner with the satellite provider to resell network services to retailers and/or customers directly to access account information and to configure network parameters associated with various network access packages offered by the partners. The retailer portal may provide an interface for retailers to access account information associated with the retailer account, to set up customer accounts, to track usage, to manage payment information, and/or to perform other activities associated with the retailer and/or customer accounts. The customer portal may provide an interface for customers to purchase data packs and/or to top-up a data pack with additional usage time and/or data, to manage payment information, to track usage, and/or perform other activities associated with their customer account.

The WBS 140 may also provide other services for managing the network, such as the Xirrus Management System (XMS) wireless network management platform for configuring Wi-Fi operations. The WBS 140 may also provide an Authentication, Authorization, and Accounting (AAA) framework for the network environment 100. The AAA framework may be used to control who is permitted to use the network resources through authentication and to capture which actions users perform while accessing the network environment 100 through accounting. The AAA framework can be used to track the amount of data used by users, the amount of time spent connected by users, or both to determine whether the user has time and/or data remaining in their data pack. The AAA framework may be configured to alert the user that the data pack is about to expire and may also be configured to provide the user with the ability to purchase top-ups and/or to add a pre-purchased top-up to the user's account.

A Wi-Fi hotspot, such as access point 105, is typically located at a retailer site, such as a grocery store, restaurant, or other retail establishment. The retailer may sell access to the broadband connection provided by the access point 105 to users who wish to access the Internet via their respective user devices. A user may connect to the Wi-Fi hotspot with various types of Wi-Fi capable user devices (not shown). For example, the user devices may be a mobile phone, tablet, laptop, portable game console, or other types of portable computing device that the users may bring with them to the location of the Wi-Fi hotspot. Other types of Wi-Fi capable computing devices may also be used to connect to the access point 105.

The retailer may configure the access point 105 to direct the user device to a captive portal. A captive portal is a webpage to which the user of the network associated with the access point 105 is directed before being granted access to the Wi-Fi network. The captive portal may in some implementations require the user to provide login credentials for accessing the network. The captive portal may also provide the user with the ability to purchase data packs. The data packs may be offered to provide the user with the ability to utilize the Wi-Fi network for a predetermined amount of time, to send and/or receive a predetermined amount of data, or both. The users may purchase the data packs and/or top-ups from the retailer.

The coverage area 115 of the access point 105 may be greatly limited. For example, a typical Wi-Fi access point may have a coverage area that is limited to approximately 100-150 meters (typically 100 meters) of the access point 105. Consequently, users must travel from their homes to the location of the access point 105 to connect to the Internet using their user devices. Furthermore, because the users must travel to the retailer site to obtain access, the users often have access to the Internet during daytime hours when it is possible to travel to the retailer site and/or the retailer has turned on the access point 105.

Figure 2:
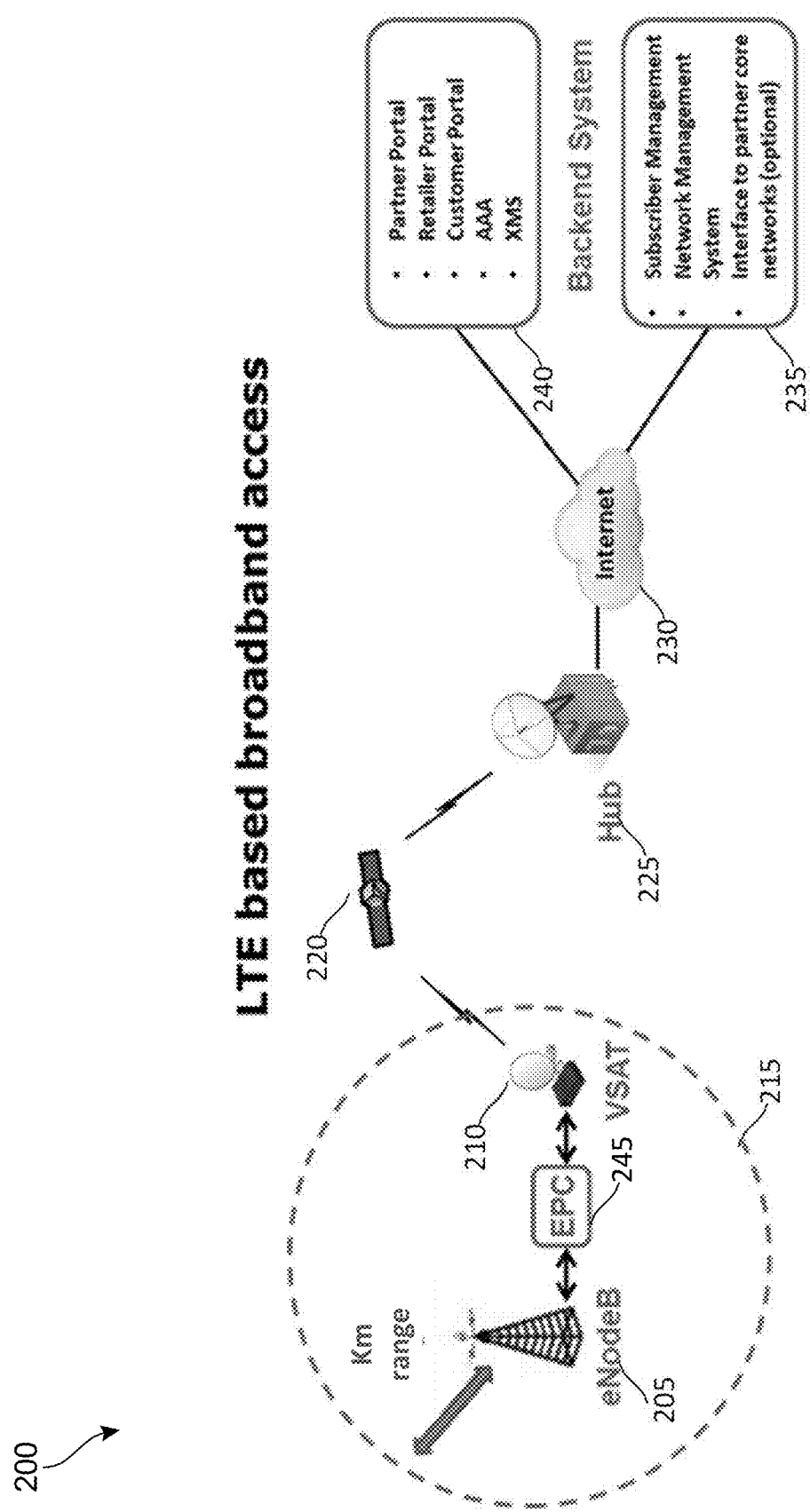
FIG. 2 is a block diagram showing an example computing environment in which the techniques disclosed herein may be implemented.

FIG. 2 shows an example network environment 200 of broadband-based network solution that provides Internet connectivity to remote geographical areas. The network environment 200 is an end-to-end architecture similar to the network environment 100 illustrated in FIG. 1 but the base station 205 provides a significantly larger coverage area 215 than the coverage area 115 provided by the access point 105. The base station 205 may be a macrocell or small cell base station and may be implemented using a Long-Term Evolution (LTE) base station, also referred to as an "eNodeB." The base station 205 may provide a coverage area 215 that has a range of few kilometers, typically five kilometers, compared to the coverage area 115 of the access point 105 which may provide a range of approximately 100 to 150 meters. In the description below, the terms "base station," "LTE base station" or "eNodeB" may be interchangeably used.

The base station 205 may connect to VSAT 210 that provides a satellite backhaul via a Evolved Packet Core (EPC) 245. The EPC or core network 245 may provide LTE interfaces and support the LTE network, which will be described in more detail with reference to FIG. 5. The satellite 220 may provide the backhaul connection and may operate in a similar manner as the satellite 120 shown in FIG. 1. The satellite 220 may communicate with the hub 225, which provides connectivity to the cloud-based backend system (CBS) via the Internet 230. The CBS includes a management system 235 and a service system 240. The service system 240 may provide similar partner, retailer, and customer portals as discussed above with respect to the WBS 140 of FIG. 1 that permits the partners, retailers, and customers to manage their respective accounts. The customer portal may permit subscribers to purchase data packs, data top-ups, and/or manage other aspects of their subscriber accounts. The customer portal may also allow the data packs and/or top-ups to be purchased through a captive portal splash page like that described above in the Wi-Fi based system of FIG. 1. The retailer portal may permit retailers to track customers, perform sales reporting, process data pack purchases, and/or manage other aspects of the retailer account. The partner portal may permit service providers to track and manage retailers, perform data usage tracking, and/or manage other aspects of the partner accounts. The AAA framework may handle authentication, authorization, and accounting, and the XMS may be used to perform monitoring and analytics. The service system 240 may form a charging system to manage customer billing information based on the portals, AAA, and XMS. The management system 235 may include subscriber management system and network management system that perform functionalities such as creating subscriber accounts, managing provisions of eNodeBs, etc. Optionally, the management system 235 may also include an interface to partner core networks. This interface may be used by roaming partners to connect to other mobile network operators' networks for a roaming agreement. Thus, the backend system CBS in the network environment 200 may operate similarly to the backend system included in the Wi-Fi based computing environment of FIG. 1.

Figure 3:
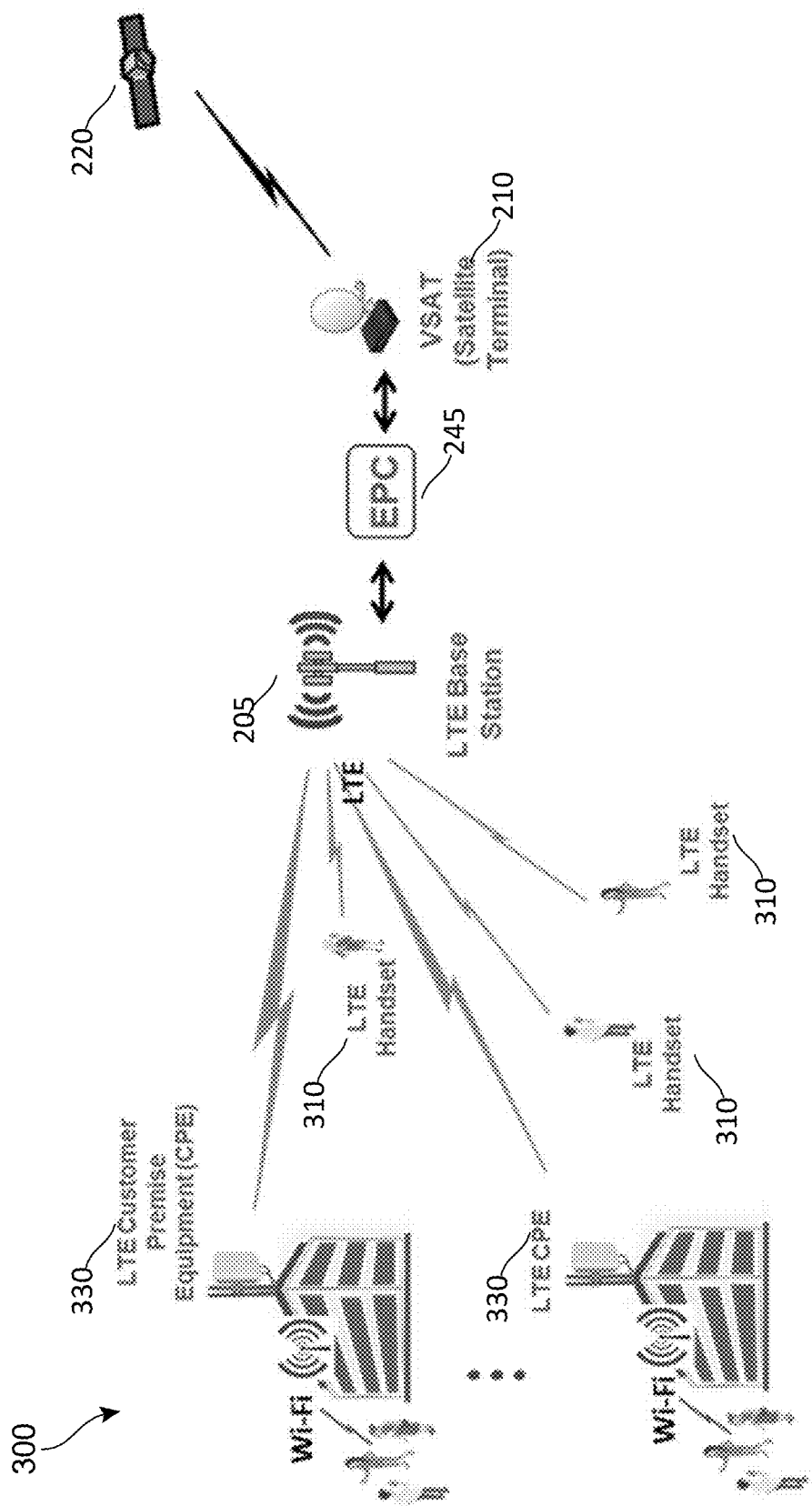
FIG. 3 is a block diagram showing partial example computing environment in FIG. 2 that supports both direct Long-Term Evolution (LTE) access and LTE access with Customer Premise Equipment (CPE).

The example network environment 200 may provide LTE access to user devices such as mobile devices and/or to LTE Customer Premise Equipment (CPE), as depicted in FIG. 3 below. In the former case, users have direct broadband access through their LTE mobile devices using an LTE interface. In the latter case, users connect to the CPE at a location through Wi-Fi and the CPE connects to the base station 205 of the LTE network to provide broadband access to the users. However, regardless of whether the users obtain the broadband service directly (via LTE interface) or indirectly (via Wi-Fi interface), the backend system CBS of the network environment 200 may manage the subscriber, retailer, and service provider to provide the same broadband access service to the users.

From a user perspective, the integrated backend system represents transparent service and consistent interfaces provided to the users. Therefore, the process for purchasing, activating the service, and data top-ups may remain the same, independent of whether the users' access is through LTE or Wi-Fi. For example, a user connecting to the network at a remote area may receive a splash page for providing user information and getting registered and authenticated in the backend system. The user may buy a data pack through a software application available in that remote area and make payment to a retailer. The user may also use the same application to add more data or top-up based on the user's data usage monitored by the retailer. The entire broadband access process looks the same for this user and other users as if they all connect to the network via Wi-Fi, no matter these users may be connected to the network directly or indirectly.

In terms of implementation, the integrated backend system means that the LTE backend system with subscriber management and charging system as shown in FIG. 2 would interface with a backend system used for Wi-Fi as shown in FIG. 1 for a common integrated system to perform the functionalities as described above with reference to customer portal, retailer portal, partner portal, AAA, XMS, charging system, etc. In some implementations, the integrated LTE backend system may be configured to interface with an existing Wi-Fi backend system as shown in FIG. 1 using an application programming interface (API). For example, the management system 235 may send user data and usage data to the WBS in the service system 240 or the analogous Wi-Fi backend system. The Wi-Fi backend system may provide data usage information in a unified interface to inquiring users. Therefore, if a user purchases data packs and obtains network access through the Wi-Fi system as shown in FIG. 1, the broadband access using the LTE network as shown in FIG. 2 does not affect the user's network experience since the integrated backend system allows the user to use the same mechanism to purchase data packs and obtain network access.

In addition to providing an integrated backend system for all end users regardless of the network accessing types, the example network environment 200 may also provide other significant advantages over community Wi-Fi based networks, such as the network environment 100 illustrated in FIG. 1. The significantly increased coverage area provided by the base station 205 permits users to obtain broadband access using their respective devices without requiring the users to travel to the location of a retailer. The network environment 200 provides a community-based Wi-Fi like network access platform for small towns and/or villages where affordability of Internet access may be a critical issue. Cellular networks typically operate on a subscription basis that involves monthly payments and/or pre-paid plans for voice and/or data access. In contrast, the network environment 200 illustrated in FIG. 2 provides a flexible solution for broadband connectivity to remote areas by allowing users to purchase flexible data plans that satisfy the needs of the user. The user may purchase hourly, weekly, and/or monthly data packs that provide access to the network as needed. This approach provides an affordable solution for broadband access in remote areas that permits users to purchase flexible plans similar to those provided by the Wi-Fi based solutions, such as that illustrated in FIG. 1, while benefiting from the significantly extended geographical coverage area provided by a broadband network base station. For example, an LTE base station may extend the geographical coverage area to as much as five kilometers from the base station.

It should be noted that the broadband access through LTE as described in the present disclosure is distinct from the cellular service that is extended into remote regions by satellite backhaul and by Mobile Network Operators (MNOs). The MNOs or wireless service carriers provide regular cellular service and network, which may connect the remote sites via a satellite backhaul when such sites cannot be reached by terrestrial connections (e.g., fibers, cables). Despite the satellite backhaul, the user access to the network and subscription are the regular cellular service for both voice and data usage. In contrast, the broadband access network described in the present disclosure is a broadband coverage extension, where the user procedures and experience are similar to that of Wi-Fi hotspots for Internet access and therefore are different from cellular service and network. Since users receive a data-centric internet connection instead of a cellular connection, for example, the users may use applications such as WhatsApp or Skype to implement voice over data when voice communication is desired.

FIG. 3 includes a block diagram 300 showing partial example computing environment in FIG. 2 that supports both direct and indirect LTE access, which is a typical use case for connecting a remote site via a satellite backhaul for broadband access. At a remote location served by a satellite terminal such as a small town or village, users can have broadband access with direct connectivity of their devices to the LTE base station or through Wi-Fi connectivity to LTE CPEs.

At the remote location, the LTE base station or eNodeB 205 provides connections to end-user devices as well as CPEs. Users may have direct LTE cellular access with their devices 310. The devices 310 may be LTE compatible mobile devices (e.g., phones, tablets, etc.) that can directly communicate with the LTE base station 205. The LTE base station 205 along with a core network 245 may connect to VSAT or satellite terminal 210 and then to the satellite 220 that provides a satellite backhaul. The core network or evolved packet core (EPC) 245 resides in a remote location. Another type of connectivity supported by the LTE base station 205 is through an LTE CPE 330. The user devices may be connected to the LTE CPE 330 (e.g., via Wi-Fi) to obtain broadband access through the LTE CPE 330, which has an LTE connection to the LTE base station 205.

A satellite terminal is usually connected to a base station at a given remote site, while a core network typically resides in a central location instead of at the remote site. However, as shown in FIG. 3, the core network 245 is configured to be deployed in the satellite terminal side along with the LTE base station 205 such that a significant amount of data traffic can be processed locally in the remote site to reduce the network traffic going over the satellite link.

Figure 4:
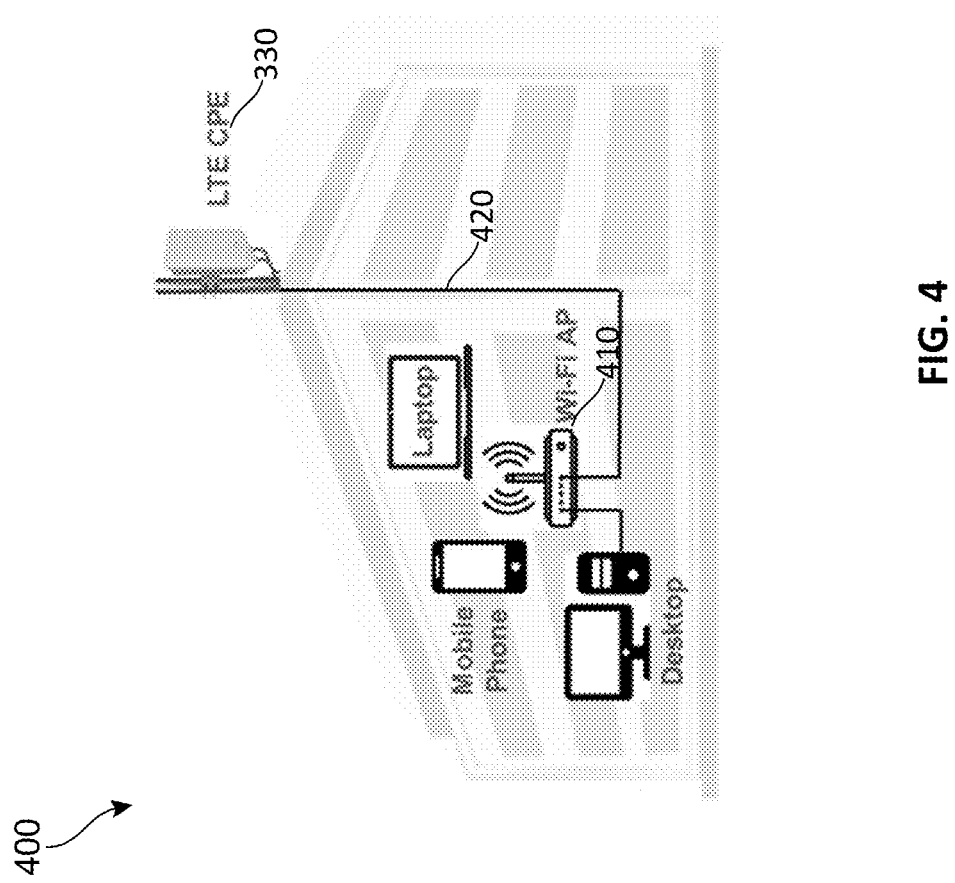
FIG. 4 is a block diagram showing an example LTE CPE interface of the computing environment components in FIG. 3.

FIG. 4 is a block diagram 400 showing an example LTE CPE interface and network access of the computing environment components in FIG. 3. The LTE CPE 330 may be mounted in a building of a home, business, school, government office, etc., for providing broadband access to a certain number of users. On one side, the LTE CPE 330 communicates with the LTE base station 205, which connects to the satellite terminal 210, satellite 22, and hub 225 to have internet access. On the other side, the LTE CPE 330 communicates with the end-user devices via Wi-Fi.

When connecting to the LTE base station 205, the LTE CPE 330 may serve as a wireless gateway router for LTE-based high-speed data services. The LTE CPE 330 may be equipped with high gain directional antennas to connect over long distances to the base station 205. The antenna size may be selected to obtain standard or high gain. The LTE CPE 330 may also include an integrated IP bridge/router. On the other side, the LTE CPE 330 may interface with the user devices to provide wireless access to bring wireless broadband data and voice services to the users. As shown in FIG. 3, the LTE CPE 330 connects to a Wi-Fi Access Point (AP) 410 inside a building through a wired connection 420. Although the external Wi-Fi AP 410 is used, the LTE CPE 330 may have built-in Wi-Fi AP support without an external Wi-Fi AP 410. The LTE CPE 330 may convert high-speed signals received from the base station 205 to Wi-Fi signals. The users may use wireless devices, including mobile phones, desktops, laptops, and other smart devices, to access the LTE CPE 330 and receive the converted signals.

In a remote location with LTE network, not only can users use their own devices directly talk to the cell tower or base station, but also users in different buildings such as schools, government offices may use their devices with Wi-Fi connections because those buildings are connected through the CPEs to the cell tower. Therefore, users can connect to the Internet at their own locations such as offices or schools as if they connect to Wi-Fi in a grocery store during the daytime as shown in FIG. 1.

Figure 5:
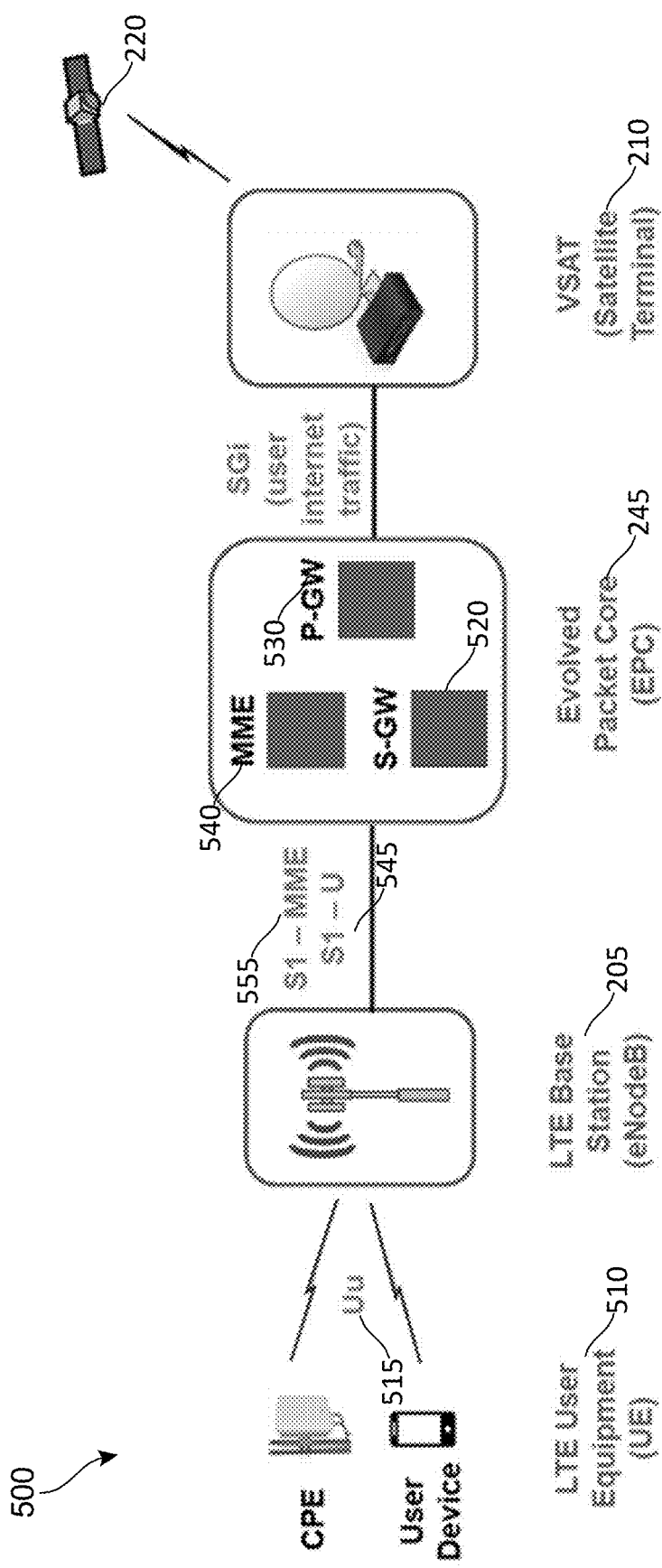
FIG. 5 is a block diagram showing a core network of the example computing environment in FIG. 2.

FIG. 5 is a block diagram 500 showing a core network of the example computing environment in FIG. 2. An LTE user equipment (UE) 510, including LTE CPE and/or user device, obtains network access through a connection with the LTE base station or eNodeB 205, and the LTE base station 205 provides radio access to the UE 510 using the Uu air interface 515. The LTE base station 205 is also coupled to the VSAT 210 via the evolved packet core (EPC) 245 to communicate with the satellite 220. The satellite 220 provides satellite backhaul connectivity for internet access to the users accessing the UE 510.

The EPC 245 is the core of the LTE network. As depicted in FIG. 5, the EPC or the core network 245 may be formed by multiple nodes such as Serving Gateway (S-GW) 520, Packet Data Network Gateway (P-GW) 530, and Mobility Management Entity (MME) 540. These nodes offer multiple functionalities including mobility management, authentication, session management, setting up bearers, and application of different quality of services. The LTE network also includes a user plane that carries the network user traffic and a control plane that is responsible for control operations such as network attaches, security control, authentication, etc. The S-GW 520 and P-GW 530 deal with the user plane while the MME 540 deals with the control plane.

The S-GW 520 is the node that connects each UE 510 to the EPC 245. The S-GW 520 may serve the UE 510 by routing the incoming and outgoing IP packets. For example, the S-GW 520 may function as an IP router with General Packet Radio Service (GPRS) Tunnel Protocol (GTP) support and charging functionality. The S-GW 520 may also act as an interface module for signaling between the P-GW 530 and MME 540. The P-GW 530 is the node that connects the EPC network 245 with external networks. By assigning an IP address, the P-GW 530 may establish a connection to a remote destination for each UE 510. The P-GW 530 may also act as an IP router with support for mobile-specific tunneling and signaling protocols. As depicted in FIG. 5, the S1 user plane interface or S1-U interface 545 is used for the tunneling of data between the UE 510 and the core network EPC 245, and the S1-MME interface 555 is used for the tunneling of control information between the UE 510 and EPC 245.

The MME 540 manages user mobility and handover execution. For example, the MME 540 may keep track of UEs 510 that are registered on the LTE network, authenticate and authorize users on the LTE network, handle the user requests for network access, and help in setting up and tearing down the data sessions, etc. The MME 540 may query a Home Subscription Server (HSS) to determine permitted services. The HSS that includes a database of user profile information may reside in the backend system as shown in FIG. 2.

As shown in FIG. 5, the core network is at the edge, that is, the EPC 245 is collocated with the LTE base station 205. With satellite backhaul connectivity for internet access, having a core network at the edge brings in multiple advantages. First, the satellite segment bandwidth is significantly saved since all the LTE signaling traffic will be locally handled without being transmitted to the satellite link. In other words, the user plane data through the S1-U interface 545 and the control plane information through the S1-MME interface 555 will be processed between the LTE base station 205 and the EPC 245 at the remote location. Only the IP Internet traffic that is stripped out of LTE overheads will be traversing the satellite link through the VSAT 210. This not only facilitates the efficient use of the satellite link but also reduces the response time and improves user experience when users access the network. Moreover, due to the local processing of signaling traffic between the LTE base station 205 and the EPC 245, the VSAT or satellite terminal 210 is eliminated from processing acceleration of LTE GTP traffic between the LTE base station 205 and the EPC 245, and thus the data processing at the satellite terminal 210 is greatly simplified.

Deploying the core network along with the base station in the remote location is also cost-efficient. Unlike the traditional mobile carrier passing cellular traffic through the satellite, user traffic going through the expensive satellite is greatly reduced and thus the corresponding cost is reduced. Also, because many core network functions are virtualized, hardware equipment that is typically required by traditional mobile operators is not needed. The core network 245 may be software installed on one of the devices in the remote area.

Figure 6:
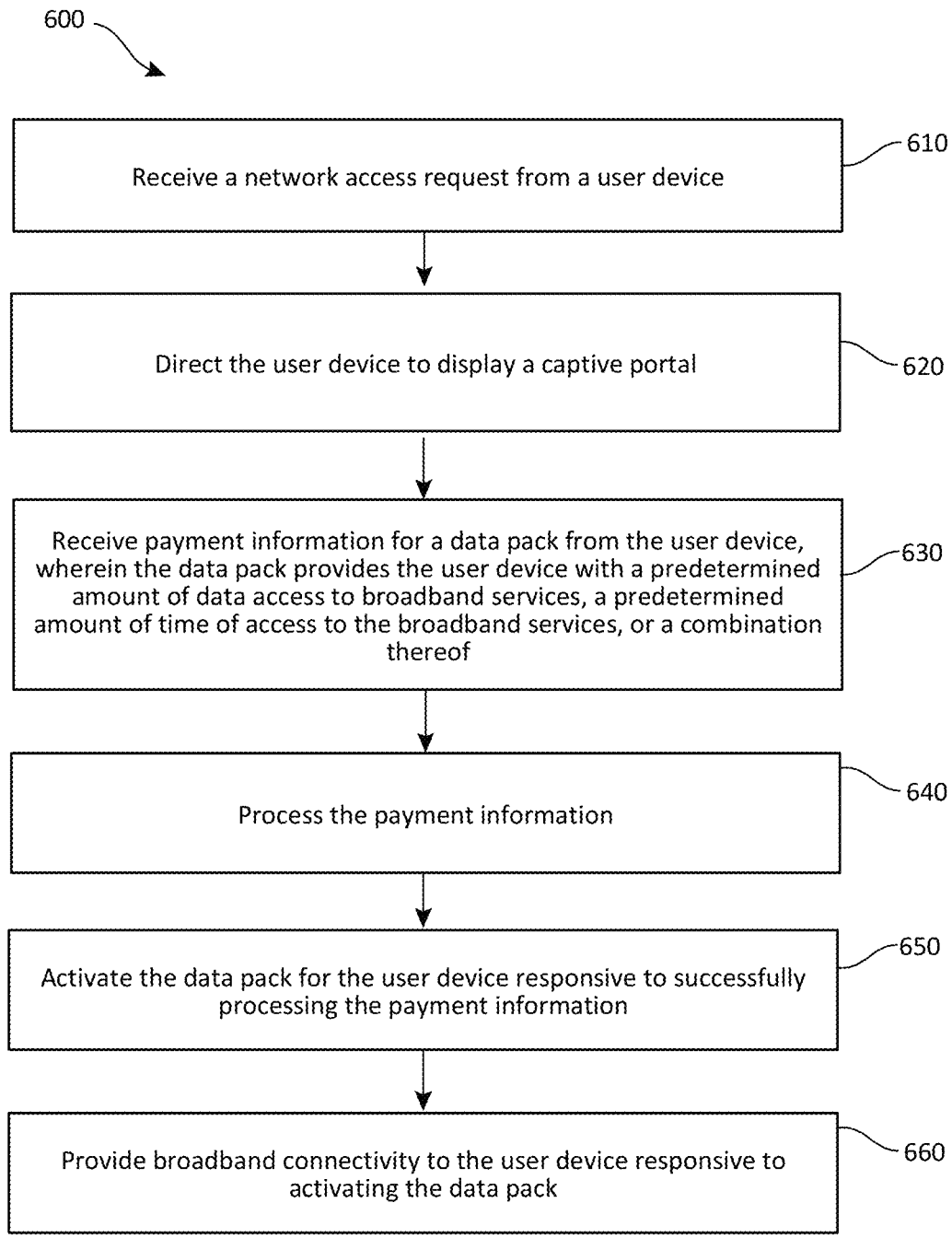
FIG. 6 is a flow chart illustrating an implementation of an example process executed by a data processing system for enrolling a subscriber.

FIG. 6 is a flow chart illustrating an implementation of an example process 600 executed by a communications system for enrolling a subscriber. The process 600 may be implemented by the network environment 200 illustrated in the preceding examples. The process 600 may be implemented by a data processing system similar to the data processing system 800 of FIG. 8.

The process 600 may include an operation 610 receiving an access request from a user device. The access request may be a network access request from a user device to permit the user device to access broadband services through the base station 205. Users may attempt to connect their user devices to a wireless network provided by the base station 205. As described in the preceding examples, the base station 205 may be configured to provide broadband access to user devices connected to the base station 205. In some implementations, the base station 205 may be an LTE eNodeB. The base station 205 may provide connectivity to the user devices via direct LTE cellular access. The base station 205 may also connect the user devices through LTE Customer Premise Equipment (CPE). The base station 205 may be located in a remote geographical location where a mobile network provided by Mobile Network Operator (MNO) is unavailable, and the base station 205 may rely on the satellite backhaul to provide the broadband connectivity to the user devices connected to the base station 205.

The process 600 may include an operation 620 of directing the user device to display a captive portal. The captive portal may be an interface where a user may purchase a data pack (or data plan) that permits the user to access the broadband services provided through the base station 205 for a limited amount of time, for a limited amount of data, or a combination thereof. For example, the user may purchase a data pack with a data cap of 100 megabytes of data that is valid for one week. The data pack expires when the user reaches the 100-megabyte limit of data or the one-week time limit has been reached. Other data packs may include a time limit but no data cap or a data cap with no time limit. These data packs may be similar to the Wi-Fi data packs that are offered in some network configurations, where broadband access may be provided by a Wi-Fi access point having a substantially smaller coverage area than the LTE base station 205.

The process 600 may include an operation 630 of receiving payment information for a data pack from the user device and an operation 640 of processing the payment information. The payment information may be transmitted to the cloud-based backend system as shown in FIG. 2 for processing. A payment receipt message may be provided by the backend system 240 to indicate whether the payment information has been successfully processed.

The process 600 may include an operation 650 of activating the data pack for the user responsive to successfully processing the payment information. The base station 205 may be configured to send an identifier of the data pack and/or user identifying information to the cloud-based backend system 340 for activating the data pack. In some implementations, the data pack may be verified and activated by the backend system in response to the payment being successfully processed, and an indication that the data pack has been activated may be sent to the base station 205.

In some implementations, the operations 630 and 640 may be combined into a single operation in which the payment information and the data pack information are sent to the backend system for processing, and the payment success indicator and the indication that the data pack has been activated may be transmitted to the base station 205 after the payment has been processed and the data pack activated.

The process 600 may include an operation 660 of providing broadband connectivity to the user device responsive to activating the data pack. Once the data pack has been activated, the user may be permitted to utilize the broadband connectivity provided by the base station 205 via the satellite 220 to send and/or receive data from the user's user device. The user may also be prompted to set up a user account and/or authentication credentials. The data pack may be associated with the user account and the authentication credentials may be used to connect to the base station 205 in subsequent usage sessions. The user may provide the authentication credentials via the captive portal in response to being redirected to the portal until the data pack expires and a top us is required. The portal may provide a means for adding top-up credits to the data pack associated with the user account. Furthermore, in some implementations, the user device may automatically connect with the base station 205 once the authentication credentials have been provided via the captive portal without redirecting the user device to the captive portal each time the device connects with the base station 205. The user may, however, be redirected to the captive portal once the credit associated with the data pack and/or top-up has expired or been exhausted or is about to expire or be exhausted.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
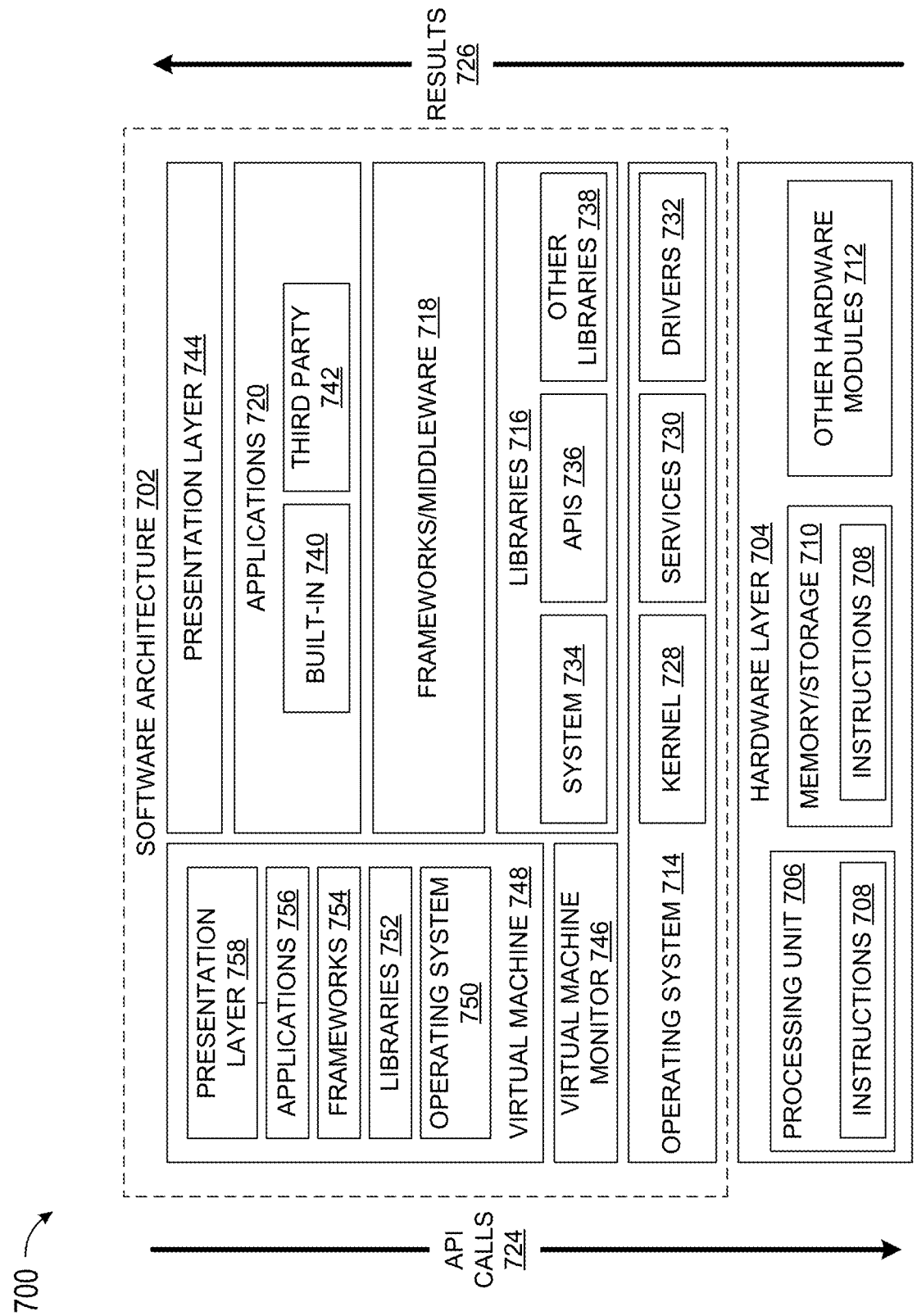
FIG. 7 is a block diagram showing an example software architecture, various portions of which may be used in conjunction with various hardware architectures herein described, which may implement any of the features described herein.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
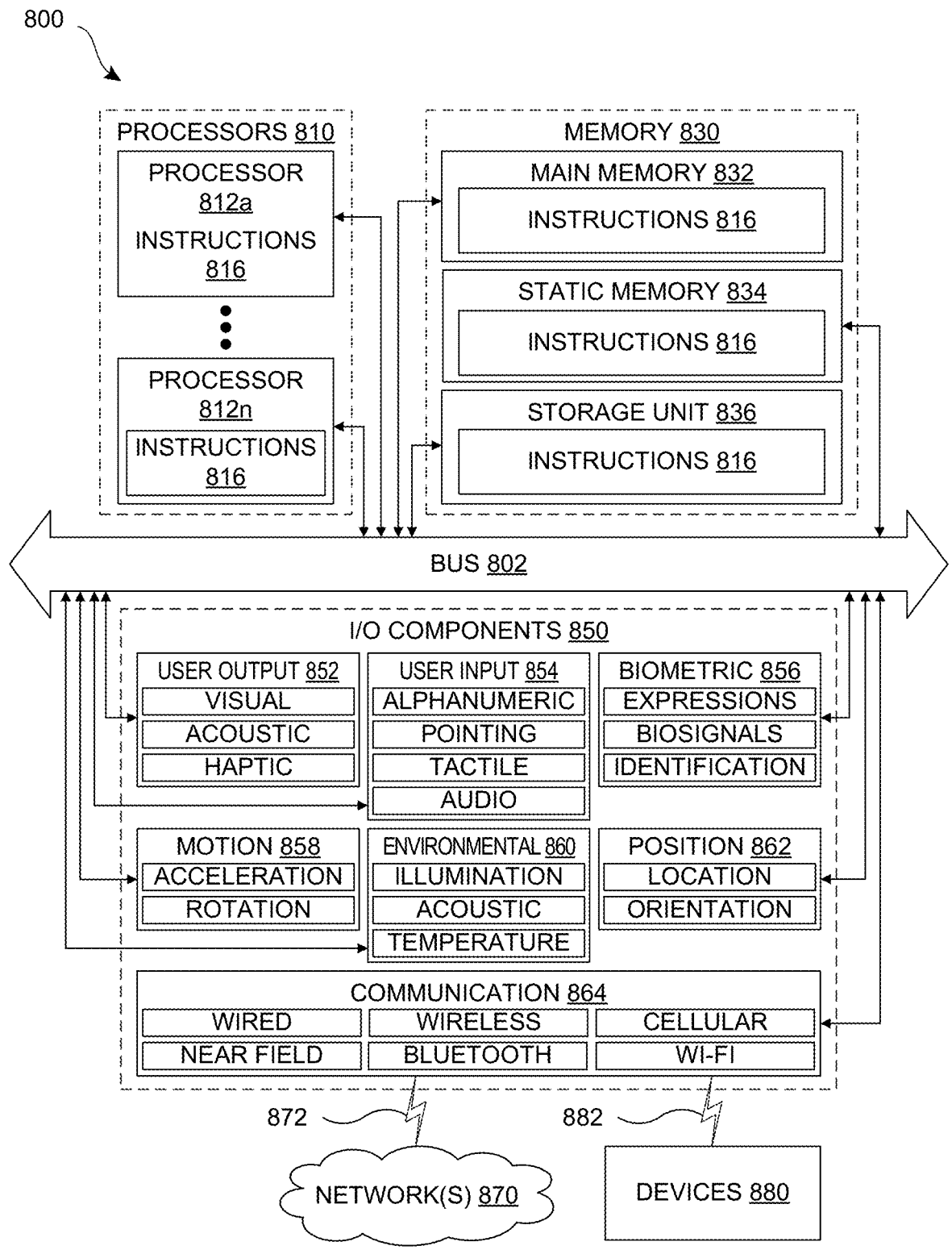
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A communications system for providing community-based broadband internet access comprising:
  a Long-Term Evolution (LTE) basestation configured to connect to one or more user devices via an LTE connection to provide broadband internet services to the one or more user devices;
  a satellite; and
  a satellite ground station configured to communicate with the LTE basestation via an Evolved Packet Core (EPC) and with the satellite to provide a backhaul connection to the LTE basestation,
  wherein the LTE basestation is configured to perform operations of:
    receiving a broadband internet access request at the LTE basestation via the LTE connection from a user device to permit the user device to access the broadband internet services via the satellite where the user device lacks a cellular network subscription to the LTE basestation over the LTE connection;
    directing the user device connected to the LTE basestation via the LTE connection to display a captive portal to permit a user of the user device to purchase a data pack for the broadband internet services provided by the LTE basestation via the satellite;
    receiving payment information for the data pack from the user device, wherein the data pack provides the user device with a predetermined amount of data access to the broadband internet services, a predetermined amount of time of access to the broadband internet services, or a combination thereof;
    processing the payment information;
    activating the data pack for the user device responsive to successfully processing the payment information; and
    providing broadband internet access to the user device connected to the LTE basestation via the satellite responsive to activating the data pack.

2. The communications system of claim 1, wherein the LTE basestation, the EPC, and the satellite ground station reside in a location where terrestrial connections are unreachable.

3. The communications system of claim 2, wherein the LTE basestation is configured to communicate with the EPC and process user plane traffic and control plane traffic in the location.

4. The communications system of claim 1, wherein the LTE basestation is configured to transmit internet traffic via the satellite ground station.

5. The communications system of claim 1, wherein the LTE basestation is configured to connect to the user device directly via the cellular network.

6. The communications system of claim 5, wherein the LTE basestation is further configured to:
connect to the user device indirectly via a wireless local area network (WLAN) connection of a Customer Premise Equipment (CPE) directly connected to the LTE basestation;
direct the user device connected via the CPE to display the captive portal to permit the user of the user device to subscribe to the broadband internet services provided by the LTE basestation via a backend system connected to the LTE basestation; and
wherein the backend system manages a service provider to provide a same broadband access service to the user whether connected via the direct LTE connection or the indirect WLAN connection.

7. The communications system of claim 5, wherein the LTE basestation is configured to communicate with the EPC and an integrated backend system to provide unified interfaces for the broadband internet services to the user device, and wherein the user device connects to the LTE basestation directly via the cellular network or indirectly via through a wireless local area network (WLAN) connection of a Customer Premise Equipment (CPE) directly connected to the LTE basestation.

8. The communications system of claim 1, wherein the LTE basestation is configured to provide voice services, data services, or a combination thereof to the one or more user devices.

9. The communications system of claim 1, wherein the LTE basestation is configured to provide for uploading data from the user device, downloading data to the user device, or a combination thereof.

10. The communications system of claim 1, wherein the satellite ground station is a Very Small Aperture Terminal (VSAT).

11. The communications system of claim 1, wherein the LTE basestation is configured to provide a captive portal system configured to direct the user device connected to the LTE basestation to a captive portal screen.

12. The communications system of claim 11, wherein the captive portal screen is configured to accept a data pack identifier, a top-up identifier, or both to permit a user to subscribe to the broadband internet services provided by the LTE basestation, to add additional funds to a subscription, or to both.

13. A data processing system for providing community-based broadband access comprising:
a processor; and
a computer-readable medium storing executable instructions for causing the processor to perform operations of:
receiving, at a Long-Term Evolution (LTE) basestation via an LTE connection, a broadband internet access request from a user device to permit the user device to access broadband internet services via the LTE basestation to a satellite where the user device lacks a cellular network subscription to the LTE basestation via the LTE connection;
directing the user device connected to the LTE basestation via the LTE connection to display a captive portal to permit a user of the user device to purchase a data pack for the broadband internet services provided by the LTE basestation via the satellite;
receiving payment information for a data pack from the user device that provides the user device with a predetermined amount of data access to the broadband internet services via the satellite, a predetermined amount of time of access to the broadband internet services via the satellite, or a combination thereof;
processing the payment information and activating the data pack for the user device; and
providing broadband internet access to the user device connected to the LTE basestation through a satellite ground station connected to a satellite.

14. The data processing system of claim 13, wherein the executable instructions further cause the processor to perform operations of:
determining that a data limit, a time limit, or both associated with the data pack has been reached;
directing the user device to display a captive portal;
presenting a notification that the data pack has expired; and
prompting a user to purchase a top-up credit for the data pack.

15. The data processing system of claim 14, wherein the executable instructions further cause the processor to perform operations of:
receiving payment information for the top-up credit for the data pack from the user device;
processing the payment information;
reactivating the data pack for the user device responsive to successfully processing the payment information; and
providing broadband internet access to the user device responsive to reactivating the data pack for the user device.

16. A method for providing community-based broadband access comprising:
receiving a broadband internet access request at a Long-Term Evolution (LTE) basestation from a user device to permit the user device to access broadband internet services via the LTE basestation to a satellite where the user device lacks a cellular network subscription to the LTE basestation over an LTE connection;
directing the user device connected to the LTE basestation via the LTE connection to display a captive portal to permit a user of the user device to purchase a data pack for the broadband internet services provided by the LTE basestation via the satellite;
receiving payment information for a data pack from the user device, wherein the data pack provides the user device with a predetermined amount of data access to the broadband internet services via the satellite, a predetermined amount of time of access to the broadband internet services via the satellite, or a combination thereof;
processing the payment information;
activating the data pack for the user device responsive to successfully processing the payment information; and
providing broadband internet access from the satellite to the user device connected to the LTE basestation responsive to activating the data pack.

17. The method of claim 16, further comprising:
determining that a data limit, a time limit, or both associated with the data pack has been reached;
directing the user device to display a captive portal;
presenting a notification that the data pack has expired; and
prompting a user to purchase a top-up credit for the data pack.

18. The method of claim 17, further comprising:
receiving payment information for the top-up credit for the data pack from the user device;
processing the payment information;
reactivating the data pack for the user device responsive to successfully processing the payment information; and
providing broadband internet access to the user device responsive to reactivating the data pack for the user device.

\* \* \* \* \*